US012659728B2

(12) United States Patent
    Liang

(10) Patent No.: US 12,659,728 B2
(45) Date of Patent: Jun. 16, 2026

(54) DATA TRANSMISSION SYSTEM WITH HIGH TRANSMISSION SECURITY

(71) Applicant: PIXART IMAGING INC., Hsin-Chu County (TW)

(72) Inventor: Jr-Kai Liang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 295 days.

(21) Appl. No.: 17/899,615

(22) Filed: Aug. 31, 2022

(65) Prior Publication Data

US 2024/0073679 A1    Feb. 29, 2024

(51) Int. Cl.
  *G06F 21/00*    (2013.01)
  *H04L 9/08*    (2006.01)
  *H04W 12/033*    (2021.01)

(52) U.S. Cl.
  CPC ......... *H04W 12/033* (2021.01); *H04L 9/0861* (2013.01); *H04L 2209/80* (2013.01)

(58) Field of Classification Search
  CPC . H04W 12/033; H04L 9/0861; H04L 2209/80
  See application file for complete search history.

(56) References Cited

U.S. PATENT DOCUMENTS

| | | | | |
|---|---|---|---|---|
| 10,972,912 | B1 * | 4/2021 | Krishnamoorthy ... | H04L 9/3247 |
| 11,246,029 | B1 * | 2/2022 | Buliga ................... | H04B 17/27 |
| 2007/0150560 | A1 * | 6/2007 | Zhang ................... | G06F 9/4401 709/220 |
| 2007/0273650 | A1 * | 11/2007 | Wu ........................ | G06F 3/0383 345/163 |
| 2009/0006846 | A1 * | 1/2009 | Rosenblatt ............ | H04W 12/08 726/9 |
| 2013/0243194 | A1 * | 9/2013 | Hawkes ................ | H04L 9/0838 380/270 |
| 2014/0104159 | A1 * | 4/2014 | Chang ....................... | G06F 3/01 345/156 |
| 2016/0004898 | A1 * | 1/2016 | Holz ..................... | G06F 3/0416 345/173 |
| 2017/0070882 | A1 * | 3/2017 | Rosa ......................... | H04L 9/14 |
| 2018/0007558 | A1 * | 1/2018 | Maragoudakis ...... | H04W 12/02 |
| 2018/0137310 | A1 * | 5/2018 | Schenk .................. | G06F 21/71 |
| 2020/0015086 | A1 * | 1/2020 | Rosenblatt ............. | G06F 21/35 |
| 2020/0233947 | A1 * | 7/2020 | Hiltgen ................ | H04W 12/06 |
| 2021/0034132 | A1 * | 2/2021 | Hamlin ................ | G06F 1/3287 |
| 2022/0014388 | A1 * | 1/2022 | Klink .................. | H04W 12/069 |
| 2022/0217002 | A1 * | 7/2022 | Karame ................. | H04L 9/083 |

* cited by examiner

*Primary Examiner* — Michael M Lee

(74) *Attorney, Agent, or Firm* — HAUPTMAN HAM, LLP

(57) ABSTRACT

There is provided a data transmission system including a human input device and a host. Before transmitting data to the host, the human input device checks whether there is any previously paired key device nearby. If there is no previously paired key device appearing close to the human input device, the human input device is arranged not to transmit data or to transmit non-dedicated data to the host.

14 Claims, 4 Drawing Sheets

100

DATA TRANSMISSION SYSTEM WITH HIGH TRANSMISSION SECURITY

BACKGROUND

1. Field of the Disclosure

This disclosure generally relates to a data transmission system and, more particularly, to a human input device of the data transmission system that determines whether to transmit data to a host by checking a nearby key device or further inserts a device identity of the nearby key device into the data or encrypts the data using a key associated with the nearby key device.

2. Description of the Related Art

A kiosk computer is arranged to be operated by multiple users. To use the kiosk computer, a user is generally requested to login a system of the kiosk computer. If the user finishes operating the kiosk computer, he needs to logout the system of the kiosk computer such that personal data specific to the user cannot be accessed by other users.

However, during a time interval after the system login and prior to the system logout, the user may temporarily leave the spot, e.g., answering a call, such that the personal data specific to the user can be accessed by other users to cause possibility of data leakage.

Meanwhile, data sent from a human input device to a host can be encrypted to increase data security. To have high data security, more complicated encryption technique can be used. However, as long as the encrypted data can be sniffed nearby, there is still a possibility that the encryption is cracked by a hacker, and fake data is generated and transmitted to the host using the same encryption technique.

Accordingly, the present disclosure provides a data transmission system whose input device transmits data to a host only when a key device (e.g., used as a key to trigger data transmission of the input device) belong to a user currently operating the input device is nearby, and stops transmitting the data when the key device is far away from the input device.

SUMMARY

The present disclosure provides a data communication system with a human input device, which has high data transmission security with a host by checking an additional key device not wirelessly coupled to the host during the data transmission between the human input device and the host.

The present disclosure provides a data transmission system including a host, a key device and a human input device. The human input device is configured to be coupled to the host via a first channel, be coupled to the key device, previously paired with the human input device, via a second channel, and detect existence of the key device to determine whether to transmit data to the host before the data is transmitted.

The present disclosure further provides a data transmission system including a host, a key device and a human input device. The human input device is configured to be coupled to the host via a first channel, be coupled to the key device, previously paired with the human input device, via a second channel, and attach a device identity of the key device to data, which is then transmitted to the host, upon existence of the key device being detected.

The present disclosure further provides an input device including a host, a key device and a human input device. The human input device is configured to be coupled to the host via a first channel, be coupled to the key device, previously paired with the human input device, via a second channel, and encrypt data, which is then transmitted to the host, using a key generated according to a device identity of the key device, upon existence of the key device being detected.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to enhance data transmission security between a human input device and a host by incorporating a third device (as a key) in a data transmission system formed by the human input device and the host. The third device is preferably a portable or wearable electronic device exclusive to one user, and the third device does not communicate with the host during the data transmission between the human input device and the host.

Figure 1:
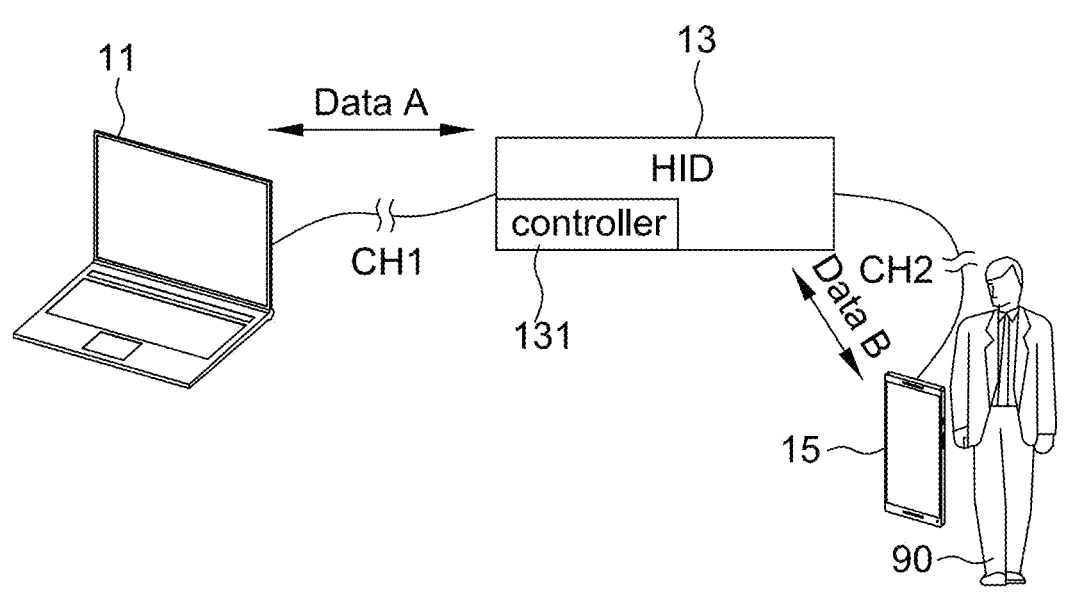
FIG. 1 is a schematic diagram of a data transmission system according to one embodiment of the present disclosure.

Please refer to FIG. 1, it is a schematic diagram of a data transmission system 100 according to one embodiment of the present disclosure. The data transmission system 100 includes a host 11 and a human input device (shown as HID) 13 coupled via a first channel CH1, which is formed by a wired communication interface (e.g., USB interface, but not limited to) or a wireless communication interface (e.g., RF interface or Bluetooth interface, but not limited to).

The human input device 13 is, for example, a mouse device (e.g., a gaming mouse), a keyboard device (e.g., a gaming keyboard), a card reader or other computer peripherals which transmit data according to the user operation.

The host 11 is a computer system (e.g., a kiosk computer), such as a desktop computer, a notebook computer or a workstation, wired or wirelessly coupled to the human input device 13 to receive data (e.g., show as Data A) transmitted therefrom via CH1, wherein the data is determined according to a type of the human input device 13. For example, if the human input device 13 is a mouse device, said data includes displacement, data of mouse roller and/or setting of shortcut keys of a gaming mouse; if the human input device 13 is a keyboard device, said data includes pressed signals associated multiple keys of the keyboard device; if the human input device 13 is a card reader, said data includes information read by the card reader.

In the present disclosure, the human input device 13 (sometimes abbreviated as input device below) further includes a controller 131 that controls whether the data is sent to the host 11 or whether to attach user information (e.g., device identity) to the data or encrypt the data using the user information according to existence of a key device 15.

The key device 15 is, for example, a smart phone, a smart bracelet, portable or wearable electronic devices exclusive to a user, i.e. a device that generally used only by one user such that it is able to recognize a specific user based on a device identity of the key device 15. The device identity is, for example, a device name or a device address. It is assumed that a user will always bring the key device 15 with him/her no matter where he or she goes.

More specifically, the key device 15 is coupled with the human input device 13 via a second channel CH2, and the second channel CH2 is formed by another wireless communication interface, such as an RF interface, a Bluetooth interface, a BLE interface or the like. The device identity is exchanged previously in a pairing procedure, which allows the human input device 13 to be able to recognize the key device 15. The device identity is stored in a memory of the human input device 13 such that the human input device 13 recognizes the key device 15.

That is, the human input device 13 includes two interfaces for respectively coupling to the host 11 and the key device 15.

In one aspect, the key device 15 previously transmits (wired or wirelessly) a device identity thereof to the host 11 to be recorded therein such that the host 11 also recognizes the key device 15.

In another aspect, the host 11 and the key device 15 are both installed with software (i.e. APP) such that a device identity of the key device 15 is transferred to the host 11 via the software.

That is, before the human input device 13 starts to transmit data (e.g., detected by sensor(s) thereof) to the host 11, a device identity associated with a key device 15 owned by a user 90 who will operate the data transmission system 100 has been recorded in the human input device 13 and the host 11.

It is appreciated that the key device 15 is not limited to one because the data transmission system 100 can be operated by multiple users.

When the user 90 operates the human input device 13, the human input device 13 detects existence of a key device 15 carried by the user 90.

In the present disclosure, at least two methods are used to confirm the existence of a key device 15.

In one aspect, the human input device 13 sends a paging message (e.g., shown as Data B) before transmitting data, and determines whether the key device 15 is detected or not according to a response message (e.g., shown as Data B) received from the key device 15 in responding to the paging message. If the response message is not received within a predetermined time interval after sending at least one paging message, the key device 15 is not nearby. For example, the human input device 13 is arranged to periodically broadcast paging messages. In one aspect, a connection between the host 11 and the human input device 13 is interrupted (no data transmission permitted) when there is no data transmission between the human input device 13 and the key device 15 for more than the predetermined time interval to enhance the data transmission security.

In another aspect, the human input device 13 compares a signal strength indicator (RSSI) of packets (e.g., shown as Data B) received from the key device 15 with an RSSI threshold to determine whether the key device 15 is detected or not. The RSSI threshold is used to determine a distance (e.g., between the human input device 13 and the key device 15). The existence of a key device 15 is confirmed only the key device 15 is within a predetermined distance (e.g., 3 meters, but not limited to) is identified. The RSSI is known to the art and thus details thereof are not described herein. In one aspect, a connection between the host 11 and the human input device 13 is interrupted (no data transmission permitted) when a distance between the human input device 13 and the key device 15 is more than the predetermined distance to enhance the data transmission security.

Figure 2:
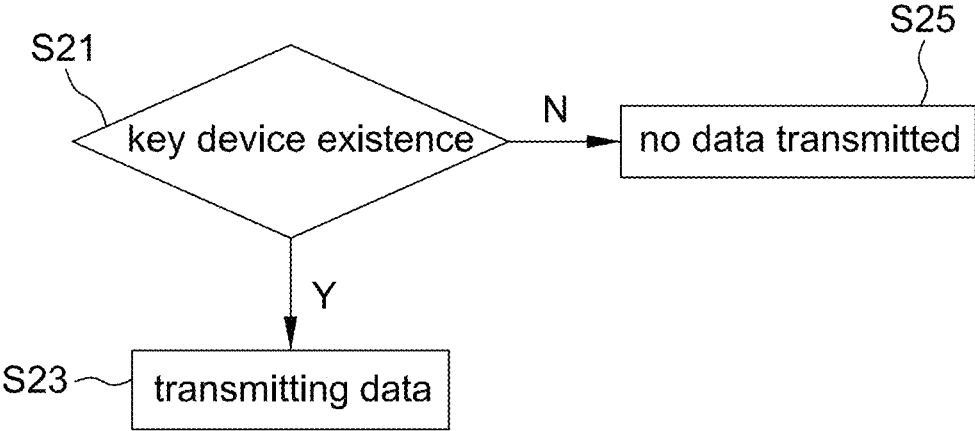
FIG. 2 is a flow chart of an operating method of an input device according to a first embodiment of the present disclosure.

Please refer to FIG. 2, it is a flow chart of an operating method of an input device 13 of the data transmission system 100 according to a first embodiment of the present disclosure, including the steps of: detecting existence of a key device 15 to determine whether to transmit data to a host 11 before the data is transmitted (Step S21); upon the key device 15 being detected, a human input device 13 transmitting the data to the host 11 (Step S23); and upon the key device 15 not being detected, the human input device 13 not transmitting any data to the host 11 (Step S25).

Step S21: The controller 131 of the input device 13 determines whether the key device 15 is nearby according to a response message or by comparing a packet RSSI with an RSSI threshold as mentioned above.

Step S23: If a key device 15 is nearby, which means an expected/legal user is operating the data transmission system 100 such that the controller 131 permits the input device 13 to transmit data to the host.

Step S25: On the other hand, if the key device 15 is not detected, which means even if the data transmission system 100 is operated by a user, the user is not an expected/legal user (e.g., it is possible that the user is further added to the data transmission system 100 using pairing procedure as mentioned above), and the input device 13 does not transmit any data to the host 11.

That is, in the first embodiment, the key device 15 is used as a key to determine whether the input device 13 transmits data to the host 11 or not.

Figure 3:
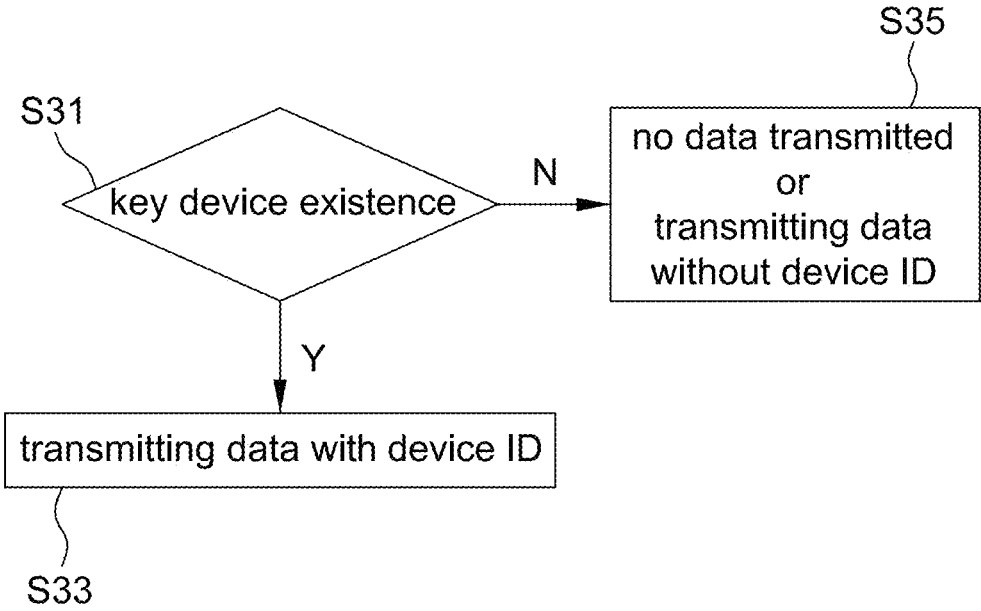
FIG. 3 is a flow chart of an operating method of an input device according to a second embodiment of the present disclosure.

Please refer to FIG. 3, it is a flow chart of an operating method of an input device 13 of the data transmission system 100 according to a second embodiment of the present disclosure. It addition to determining whether to allow the input device 13 to transmit data or not, in the second embodiment the input device 13 further attaches a device identity to the transmitted data such that the host 11 can recognize which user is operating the data transmission system 100.

Step S31: The input device 13 detects existence of a key device 15 according to a response message from the key device 15 or by comparing a signal strength indicator (RSSI) of packets received from the key device 15 with an RSSI threshold as mentioned above.

Step S33: When a key device 15 is detected, it means that the input device 13 is nearby and the input device 13 attaches a device identity of the key device 15 to data, which is then transmitted to a host 11. As mentioned above, the device identity is previously recorded in the input device 13 and the host 11. In this way, the host 11 knows which of the device identity (or user) that the data is related.

In the present disclosure, the host 11 records operations associated with the data being attached with the device identity as historical records of the related device identity (or related user). In this way, it is able to know who, i.e. associated with the device identity, accesses the host 11 to enhance the management of the host 11 (or data transmission system 100).

Step S35: On the other hand, when the key device 15 is not detected, it means that the input device 13 is not nearby and the human input device 13 does not transmit any data to the host 11. In another aspect, when the key device 15 is not detected, the human input device 13 is arranged to transmit data without being attached with a device identity to the host 11. For example, if the input device 13 is a gaming mouse and when the key device 15 is not detected, the gaming mouse outputs displacement or data of mouse roller to the host 11 but does not output signals of shortcut keys (e.g., a button which outputs signals of multiple keys of keyboard). In another aspect, at least one button of a gaming mouse does not function when the key device 15 is not detected. In another aspect, at least one function of the input device 13 is deactivated when the key device 15 is not detected.

Figure 4:
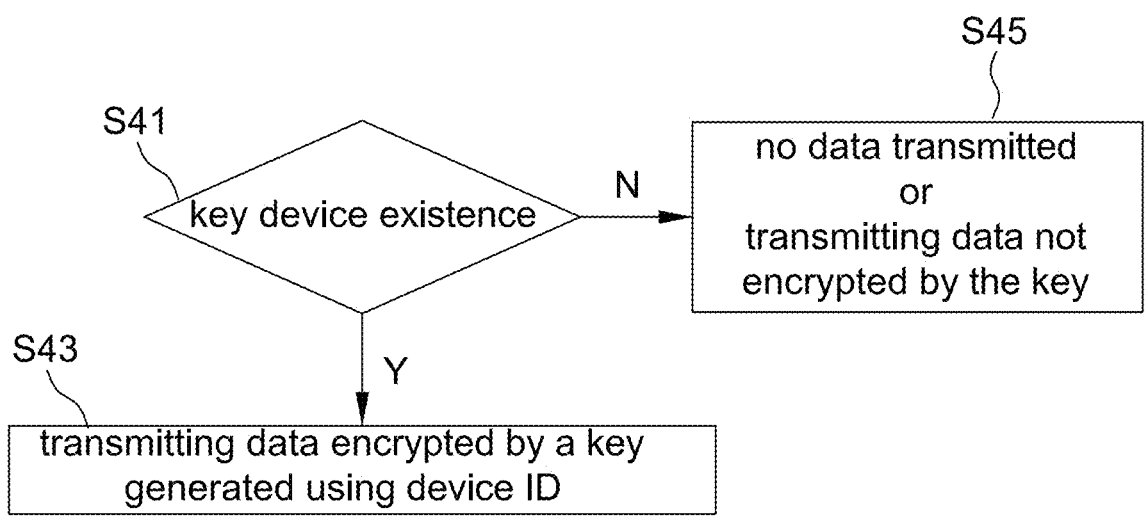
FIG. 4 is a flow chart of an operating method of an input device according to a third embodiment of the present disclosure.

Please refer to FIG. 4, it is a flow chart of an operating method of an input device 13 of the data transmission system 100 according to a third embodiment of the present disclosure. It addition to determining whether to allow the input device 13 to transmit data or not, in the third embodiment the input device 13 further encrypts the transmitted data using a key generated by a device identity to enhance the data transmission security.

Step S41: The input device 13 detects existence of a key device 15 according to a response message from the key device 15 or by comparing a signal strength indicator (RSSI) of packets received from the key device 15 with an RSSI threshold as mentioned above.

Step S43: When the key device 15 is detected, it means that the input device 13 is nearby and the input device 13 encrypts data, which is then transmitted to a host 11, using a key generated according to a device identity of the key device 15. The methods of generating a key according to a device identity, e.g., including a device name, a device address, a time stamp or the like, and encrypting data using the device identity (e.g., using AES-128, AES-256) are known to the art, and thus details thereof are not described herein. Similarly, the key is previously generated in pairing the key device 15 and the human input device 13. The input device 13 is previously recorded (in the memory thereof) with the key for encrypting the transmitted data. The host 11 is also previously recorded with the key for decrypting the encrypted data received from the human input device 13.

Similarly, the host 11 is arranged to record operations associated with the data being encrypted by the key generated according to a device identity as historical records of the device identity to enhance the management of the host 11 (or data transmission system 100).

The input device 13 is further arranged to attach the device identity to the encrypted data to the host 11, similar to the second embodiment.

Step S45: However, when the key device 15 is not detected, it means that there is no expected/legal user in operation of the data transmission system 100, and thus the human input device 13 does not encrypt data and does not transmit any data to the host 11. In another aspect, when the key device 15 is not detected, the human input device 13 transmits data without being encrypted by the key generated according to any device identity recorded therein such that the host 11 knows the non-encrypted is generated by an unexpected/illegal user. In one aspect, the host 11 also records operations associated with the unexpected user to know what kinds of data has been accessed by the unexpected/illegal user.

Figure 5:
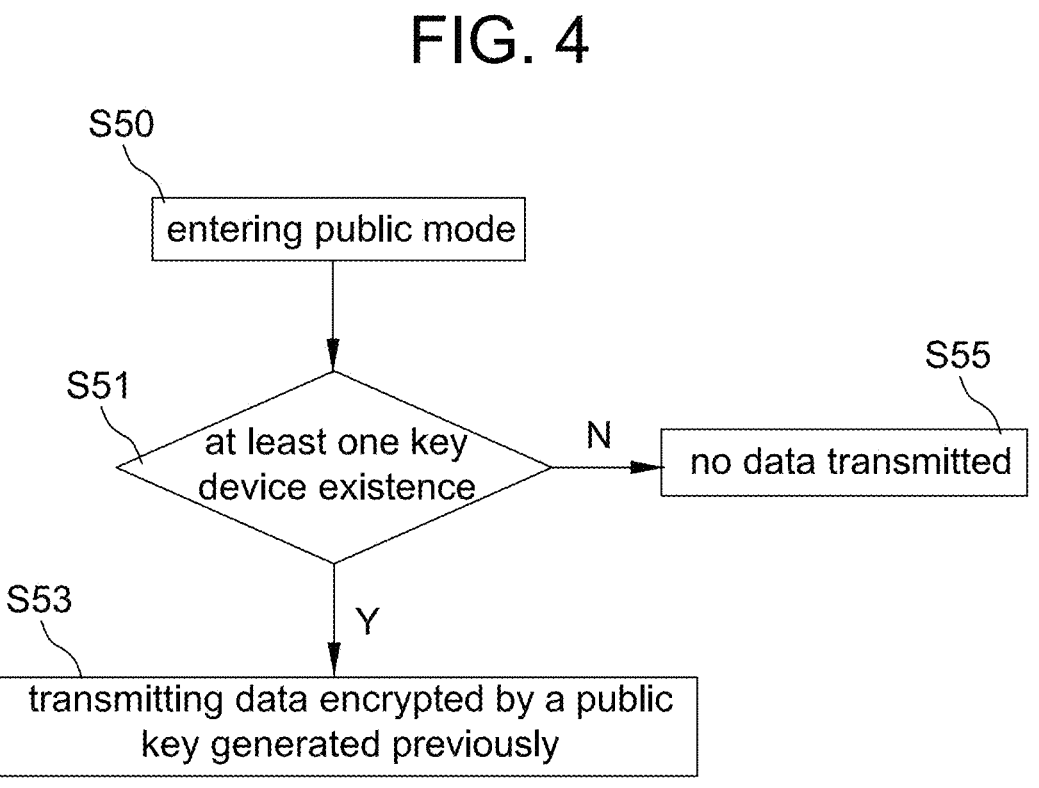
FIG. 5 is a flow chart of an operating method of an input device according to a fourth embodiment of the present disclosure.

Please refer to FIG. 5, it is a flow chart of an operating method of an input device 13 of the data transmission system 100 according to a fourth embodiment of the present disclosure. In this embodiment, multiple expected/legal users are with a detecting range (or operable range) of the input device 13, and the multiple users will use the data transmission system 100 sequentially in a public mode.

Step S51: The data transmission system 100 of the present disclosure further includes a public mode in which multiple users (more specifically multiple key devices) are within a predetermined distance (i.e. operable range) from the input device 13. That is, when the public mode is entered, the input device 13 is coupled to multiple key devices 15 via multiple channels CH2 at the same time. The multiple key devices 15 are all previously paired with the human input device 13.

In the present disclosure, the public mode is entered by operating the APP in the host 11, and then the APP informs the multiple key devices 15 at the spot. In another aspect, the public mode is entered by pressing a button or switching a knob on the input device 13, and the input device 13 then informs the host 11 via the first channel CH1 as well as the multiple key devices 15 via the second channel CH2. In the public mode, the host 11 and the input device 13 use a common key Step S53: The input device 13 then detects an existence of any of the multiple key devices 15 according to response messages from the multiple key devices 15 or by the packet RSSI as mentioned above.

Step S55: When at least one of the multiple key devices 15 is detected, the human input device 13 encrypts public data (for distinguishing data mentioned in FIGS. 2-4), which is then transmitted to the host 11, using a common key previously generated. For example, the common key is previously generated and recorded according to device identities and time stamps of the multiple key devices 15, but not limited to. In another aspect, said common key is directly given by the host 11 using the APP and previously transferred to, wired or wirelessly, the multiple key devices 15 and the input device 13.

The Steps S51, S53 and S55 of FIG. 5 is similar to the Steps S41, S43 and S45 of FIG. 4 with a difference that in FIG. 4 the keys of different key devices 15 are different from one another, but in FIG. 5 the common keys of the multiple key devices 15 are all identical.

In the present disclosure, the key device 15 is used as a key to permit the human input device 13 to transmit data, to attach a device identity to the data and to encrypt the data using the device identity when the key device 15 is nearby, but the key device 15 does not transmit data to the host 11 in the data transmission between the human input device 13 and the host 11.

In the present disclosure, the "previously" is referred to prior to one user login the host 11 for the first time.

It is appreciated that the human input device 13 includes a processor, e.g., application specific integrated circuit (ASIC), a micro controller unit (MCU) or a field programmable gate array (FPGA) to implement functions executed thereby, and the controller 131 is embedded in the processor or implemented by an independent hardware and/or firmware.

As mentioned above, in one aspect when a key device 15 associated with a current user is not nearby, no data is transmitted from the human input device 13 to the host 11.

In other aspects, when the key device 15 associated with a current user is not nearby, the human input device 13 is arranged to transmit normal data (e.g., mouse displacement or data of mouse roller) without transmitting any user exclusive data (e.g., setting of shortcut keys).

As mentioned above, the conventional human input device cannot recognize different users such that anyone can use the human input device to access data from a computer system as long as the computer system is logged in by a legal user (or an authenticated user). Accordingly, the present disclosure further provides a data transmission system (e.g., FIG. 1) and an operating method of an input device thereof (FIGS. 2-4) that is arranged to check a nearby key device, which is exclusive to a current user, before transmitting data to a host.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A human input device, coupled with a host by wire or wirelessly, wherein
   the human input device is configured to
      be operated by a user by performing at least one of rolling a roller thereon, pressing a key thereon or moving on a surface, and
      transmit data, which is generated by the human input device, to the host only after receiving a device identity from an external device configured to be carried by the user,
   wherein at least one button of the human input device configured to control the host is functioned only after the human input device receives the device identity from the external device,
   the data is not provided by the external device, and
   the human input device is a mouse device.

2. The human input device as claimed in claim 1, wherein
   the human input device and the host are coupled via a first channel formed by a wired or wireless communication interface, and
   the external device is previously paired with the human input device via a second channel formed by another wireless communication interface.

3. The human input device as claimed in claim 1, wherein upon not receiving the device identity from the external device, the human input device is configured not to transmit any data to the host.

4. The human input device as claimed in claim 1, wherein the human input device is configured to
   periodically broadcast a paging message to the external device before transmitting the data, and
   receive a response message responding to the paging message from the external device.

5. The human input device as claimed in claim 1, wherein the data is detected by a sensor of the human input device.

6. The human input device as claimed in claim 1, wherein the external device is a portable electronic device or a wearable electronic device.

7. The human input device as claimed in claim 1, wherein the transmitted data comprises at least one of displacement data and mouse roller data.

8. A human input device, coupled with a host by wire or wirelessly, wherein
   the human input device is configured to
      be operated by a user by performing at least one of rolling a roller thereon, pressing a key thereon or moving on a surface,
      attach a device identity of an external device to data generated by the human input device, and
      transmit the data and the attached device identity to the host only after receiving the device identity from the external device,
   wherein the data is not provided by the external device,
   at least one button of the human input device configured to control the host is functioned only after the human input device receives the device identity from the external device,
   the human input device is a mouse device, and
   the external device is configured to be carried by the user.

9. The human input device as claimed in claim 8, wherein
   the device identity is previously exchanged in pairing the external device and the human input device, and
   the host is previously recorded with the device identity.

10. The human input device as claimed in claim 8, wherein the data is detected by a sensor of the human input device.

11. The human input device as claimed in claim 8, wherein upon not receiving the device identity from the external device, the human input device is configured to not transmit any data to the host.

12. The human input device as claimed in claim 8, wherein upon not receiving the device identity from the external device, the human input device is configured to transmit the data without being attached with the device identity to the host.

13. The human input device as claimed in claim 8, wherein the host is configured to record operations associated with the data being attached with the device identity as historical records of the device identity.

14. A human input device, coupled with a host by wire or wirelessly, wherein
   the human input device is configured to
      be operated by a user, and
      transmit data, which is generated by the human input device, to the host only after receiving a device identity from an external device configured to be carried by the user,
   wherein the data is not provided by the external device, and
   at least one button of the human input device configured to generate output signals of shortcut keys is functioned only after the human input device receives the device identity from the external device.

* * * * *